United States Patent [19]

Whittle

[11] Patent Number: 5,349,284
[45] Date of Patent: Sep. 20, 1994

[54] POWER FACTOR BOOST CONVERTER POWER SUPPLY

[75] Inventor: Rex W. J. Whittle, Kowloon, Hong Kong

[73] Assignee: Astec International, Ltd., Hong Kong

[21] Appl. No.: 126,423

[22] Filed: Sep. 24, 1993

Related U.S. Application Data

[63] Continuation of Ser. No. 841,702, Feb. 26, 1992, abandoned.

[30] Foreign Application Priority Data

Feb. 27, 1991 [GB] United Kingdom ............... 9104070

[51] Int. Cl.$^5$ ............................................. G05F 1/70
[52] U.S. Cl. ................................. 323/207; 323/210; 323/222; 323/285
[58] Field of Search ............... 323/205, 207, 210, 211, 323/222, 223, 282, 285

[56] References Cited

U.S. PATENT DOCUMENTS

| | | | |
|---|---|---|---|
| 4,533,986 | 8/1985 | Jones | 323/222 |
| 4,677,366 | 6/1987 | Wilkinson | 323/222 |
| 4,683,529 | 7/1987 | Bucher | 323/207 |
| 4,761,725 | 8/1988 | Henze | 323/283 |
| 4,792,887 | 12/1988 | Bernitz et al. | 323/222 |
| 4,837,495 | 6/1989 | Zansky | 323/222 |
| 4,924,372 | 5/1990 | Fox et al. | 323/222 |
| 4,974,141 | 11/1990 | Severinsky et al. | 323/224 |
| 5,001,620 | 3/1991 | Smith | 323/222 |
| 5,003,454 | 3/1991 | Bruning | 323/222 |
| 5,134,355 | 7/1992 | Hastings | 323/211 |
| 5,146,398 | 9/1992 | Vila-Masot et al. | 363/222 |

FOREIGN PATENT DOCUMENTS

| | | | |
|---|---|---|---|
| 0199903A2 | 11/1986 | European Pat. Off. | H02M 3/10 |
| 0352983A1 | 1/1990 | European Pat. Off. | H02M 1/00 |
| 0386980A2 | 9/1990 | European Pat. Off. | H02M 3/156 |
| 0431778A1 | 6/1991 | European Pat. Off. | H02M 3/156 |
| 1496130 | 12/1977 | United Kingdom | H05B 41/24 |

OTHER PUBLICATIONS

Technical Data Sheet for the "ASTEC AS3842/3/4/5 Current Mode PWM Controller," ASTEC Semiconductor, Apr. 1990.

Technical Data Sheet for the "UNITRODE UC1854/2854/3854 High Power Factor Preregulator," UNITRODE Integrated Circuits Corporation.

Primary Examiner—Jeffrey L. Sterrett
Attorney, Agent, or Firm—McCubbrey, Bartels & Ward

[57] ABSTRACT

A boost-type power factor correction circuit is disclosed in which output voltage of the convertor is proportional to the peak input voltage. To achieve this, the circuit includes a peak rectifier D2, C2 which senses peak input voltage and provides a reference to which the output voltage derived through resistors R3, R4 is compared to give an error signal dependent upon variation from the peak input voltage derived reference. The error signal is used to control a MOSFET switch 120 to provide an output voltage $V_{out}$ dependent upon the reference.

11 Claims, 3 Drawing Sheets

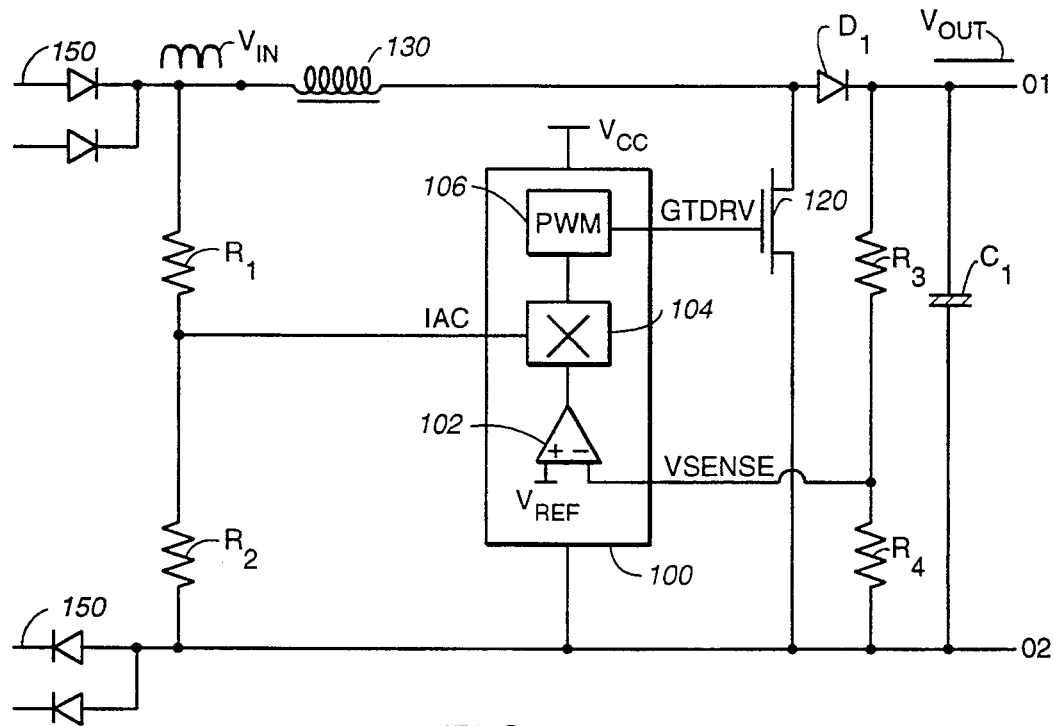
FIG._1
*(PRIOR ART)*
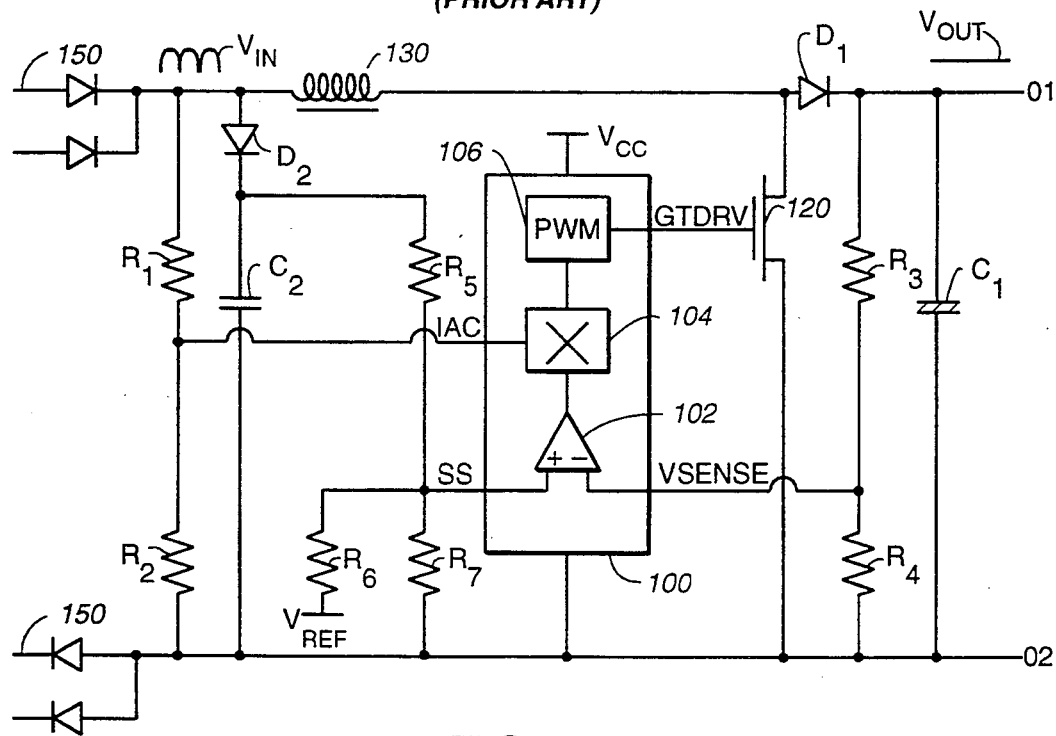
FIG._3

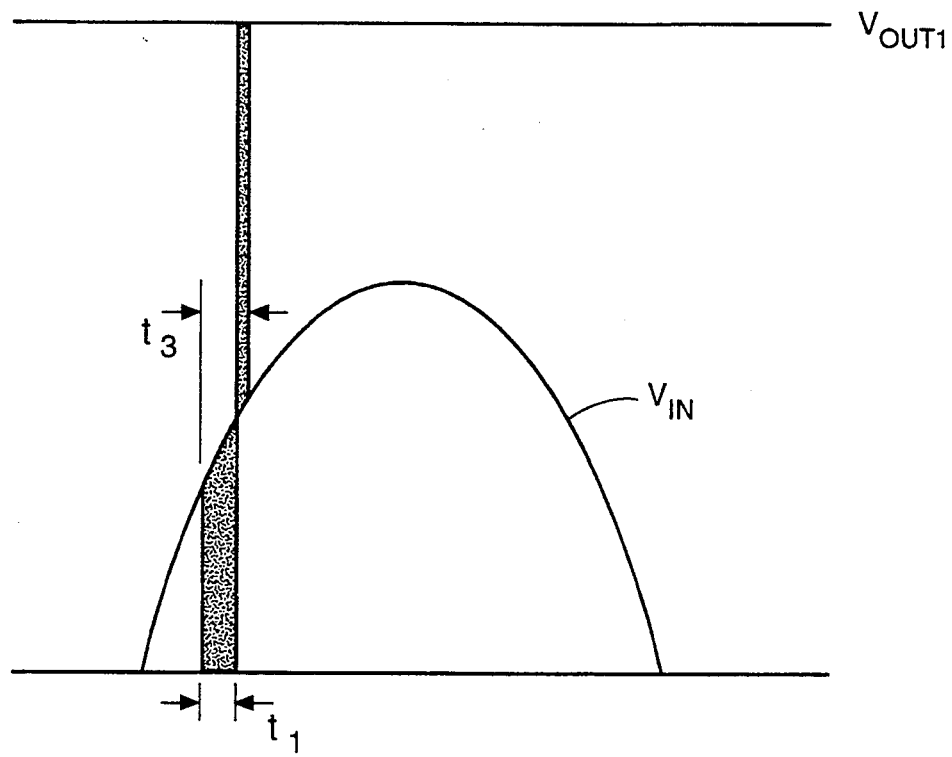
FIG._2A
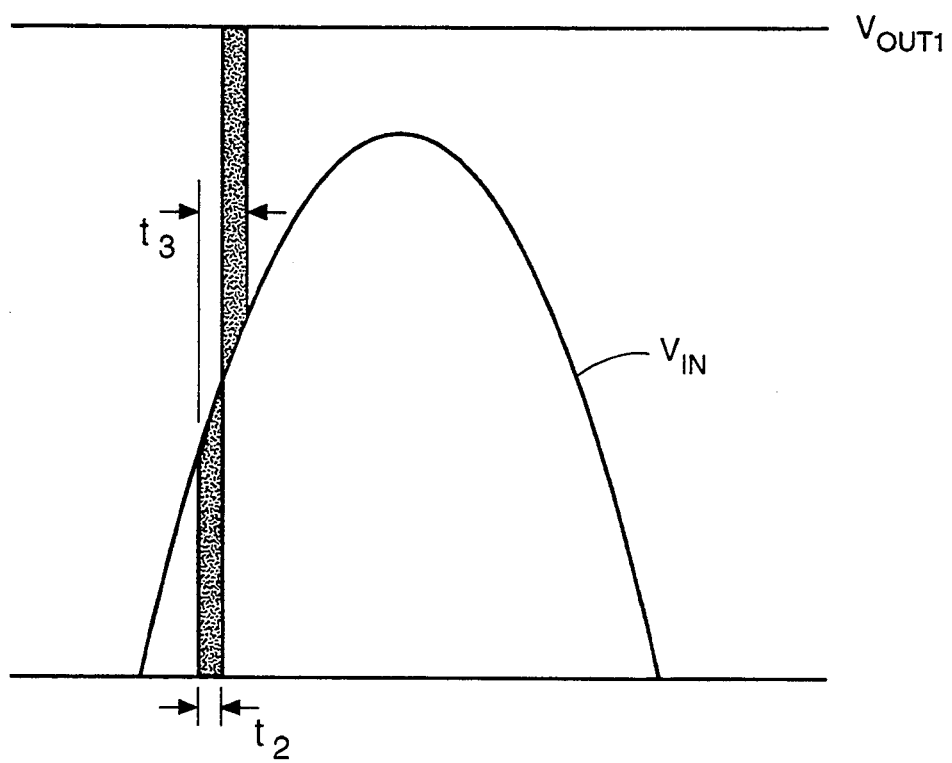
FIG._2B

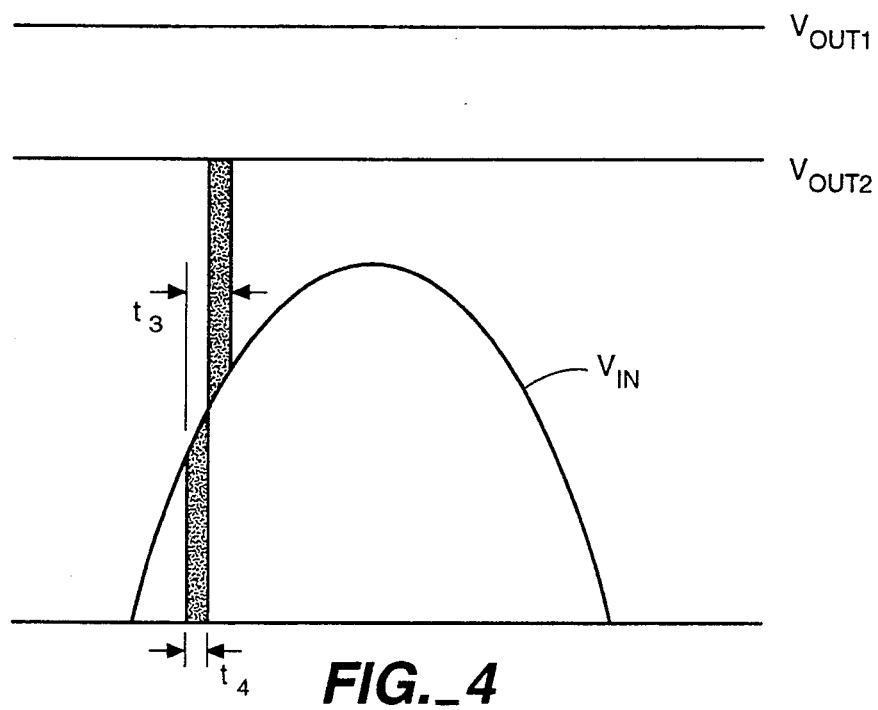
FIG._4
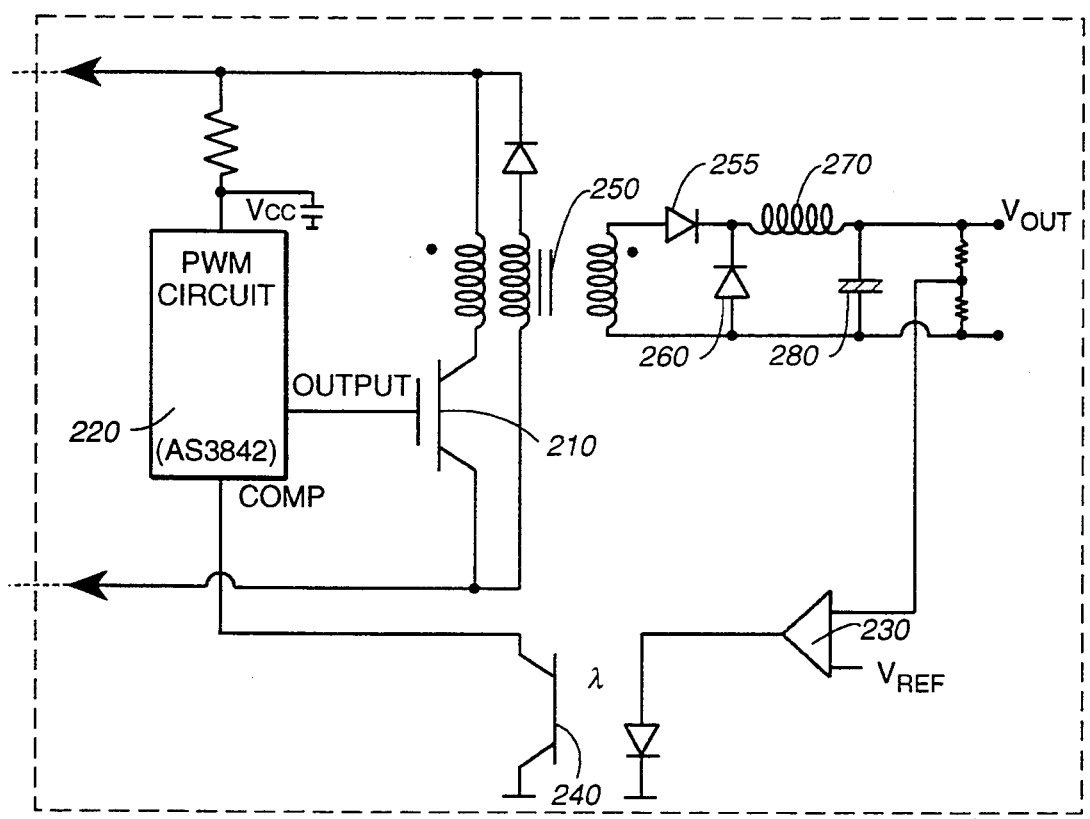
FIG._5

POWER FACTOR BOOST CONVERTER POWER SUPPLY

This application is a continuation of application Ser. No. 07/841,702, filed Feb. 26, 1992, now abandoned.

BACKGROUND OF THE INVENTION

This invention relates to a power supply and particularly to a boost converter therefor.

Power supplies for generating a predetermined voltage/current for a given application can make abnormal demands on the line supply caused by the harmonic content of the current drawn from the line. In particular, a high third harmonic content can give a large neutral current which can place unacceptable loads on the line supply transformer.

To compensate for this problem, boost-type power factor correction circuits have been developed to reduce the harmonic content. The correction circuits modify the current wave form to reduce the harmonics and thus follow more closely a sinusoidal wave form in phase with the line voltage. Such circuits generally comprise an electronic switch which is cyclically switched to control current through a boost inductor, the duty cycle of the switch being pulse width modulated so that the peak switch current, or preferably the average current in the supply return which comprises the average switch current plus the average load current, follows the line voltage while retaining the output voltage at a constant level. Control of the switch is performed by a high power factor pre-regulator circuit and a suitable circuit for performing this function is manufactured by Unitrode Integrated Circuits Corporation under their references UC1854, 2854 and 3854.

In general, power factor correction circuits are designed to work over all usual line voltages used worldwide, typically 65 VAC-265 VAC and provide a well regulated output voltage for input to a bulk convertor of standard design which performs the required voltage/current conversion for a particular application.

It is a disadvantage of such power factor correction circuits that the efficiency of the circuit decreases as the peak input voltage decreases, as the circuit has to work harder to generate the regulated output voltage to the bulk convertor, and thus greater operational losses are incurred.

SUMMARY OF THE INVENTION

It is an object of the invention to alleviate this disadvantage and in accordance with the invention there is provided a boost-type power factor correction circuit comprising a boost inductor, an electronic switch controlling current through the inductor, a capacitor, rectifier means connecting the capacitor to the inductor such that energy stored in the inductor is transferable to the capacitor, means for cyclically switching the electronic switch, means for controlling the switch duty cycle to cause the input current to follow the input voltage applied to the convertor and to regulate the output voltage of the convertor to be proportional to the peak input voltage.

With a boost-type power factor correction circuit of the invention, as the output reference voltage is made proportional to the input peak voltage, the demands on the control means are correspondingly reduced.

Preferably, the controlling means comprises means for comparing the output voltage with a reference proportional to the input peak voltage and for generating an error signal and means for generating a control signal for the switch in dependence upon the error signal.

The control means further preferably comprises a peak rectifier for sensing the peak input voltage and generating a voltage proportional thereto. Furthermore, the peak rectifier output may be summed with a fixed voltage component to bias the reference to a particular base level.

Such a circuit preferably generates an output voltage controlled to be linearly proportional to the peak input voltage. However, the output voltage can be controlled to be proportional in a non-linear manner provided the voltage remains within limits acceptable to the bulk convertor to which the power factor correction circuit is connected.

An embodiment of the invention will now be described, by way of example, with reference to the accompanying drawings in which:

BRIEF DESCRIPTION OF THE DRAWINGS

FIG. 1 is a diagram illustrating a prior art power factor correction circuit.

FIGS. 2a and 2b are diagrams illustrating how the output voltage is controlled by the circuit of FIG. 1 for different peak line input voltages.

FIG. 3 is a diagram illustrating an embodiment of the power factor correction circuit in accordance with the invention.

FIG. 4 is a diagram illustrating the control of output voltage in dependence upon peak input line voltage for the embodiment of FIG. 4.

FIG. 5 illustrates a standard bulk convertor suitable for connection to the embodiment of FIG. 3.

DESCRIPTION OF THE PREFERRED EMBODIMENT

With reference to FIGS. 1 and 2, a prior art boost-type power factor correction circuit is shown. For simplicity of explanation, the circuit has been shown based upon a commercially available high power factor pre-regulator control circuit manufactured by Unitrode Integrated Circuits Corporation under their reference UC1854, labeled 100 in FIG. 1. This circuit includes, inter alia, a differential amplifier 102 which generates an error signal at its output, a precision multiplier 104 and a fixed frequency pulse width modulator and a power MOSFET gate driver 106, which are shown schematically as FIG. 1, as are the relevant chip pin pneumonics.

The control circuit 100 controls the gate of a power MOSFET switch 120 which is used to control current through a boost inductor 130 which is connected via a bridge rectifier 150 to the line supply. A rectifier D1, C1 is connected downstream of the switch 120 which provides a rectified and smoothed output voltage $V_{out}$ at output terminals 01, 02.

The circuit 100 is cyclically switched to control the peak switch current so that the input current follows a variable amplitude reference derived from the supply line voltage $V_{IN}$ via resistors R1, R2 which is applied to the multiplier 104 of the amplifier 100. Error signal generating circuit 102 compares a DC voltage derived from $V_{OUT}$ at a point between resistors R3, R4 with a fixed DC reference voltage $V_{REF}$ and provides an error signal which controls the amplitude of the sine wave reference signal by varying the gain of the multiplier 104. Using the output signal from the multiplier 104, the modulator and gate driver 106 adjusts the duty cycle of the switch 120 so that the current follows a rectified sinusoidal wave form in phase with the input voltage and at the same time maintains $V_{out}$ at a constant regulated value.

The power factor correction circuit shown in FIG. 1 is able to operate over a wide range of input line voltages and compensates for the line voltages to provide the fixed voltage output $V_{OUT}$ in the manners shown in the FIGS. 2a and 2b.

In these figures, the line input voltage $V_{IN}$ is shown in comparison with the fixed voltage $V_{OUT}$. Each switch cycle of the switch 120 is a fixed time t3, with the duty cycle within that switch cycle being varied in the manner described above. As shown in FIG. 2a, for a low peak voltage input, the required ON time t1 of the switch 120 forms the substantial portion of the total switch cycle time t3, to enable the VT (Volt×Second) product of the switch ON time (shown shaded below the curve $V_{IN}$) to be equal to the VT product of the switch OFF time (shown by the shaded area above the $V_{IN}$ wave form), which is a necessary requirement for operation of the inductor 130.

FIG. 2b is the same as FIG. 2a but showing the duty cycle of the switch 120 for a higher peak input voltage wave form from which it can be seen that the ON time t2 of the switch is a much lower proportion of the cycle time t3 than for the lower peak voltage wave form of FIG. 2a. Whenever the switch 120 is on, power losses are inevitably introduced which increase with reducing peak input voltage.

A boost-type power factor correction circuit being an embodiment of the invention is shown in FIG. 3 which controls the output voltage to be proportional to the peak input voltage.

This is achieved by adjusting the reference voltage of error amplifier 102, by connecting the reference to a peak rectifying circuit D2, C2 which gives a voltage on capacitor C2 directly proportional to the peak of the input AC voltage $V_{IN}$. Current from rectifier D2, C2 is fed to summing resistor R7 where it is summed with current from reference voltage $V_{REF}$ via resistor R6 to develop a voltage proportional to the AC supply with a fixed component proportional to the system voltage reference $V_{REF}$. Thus, in the circuit of shown in FIG. 3, in comparison with the circuit FIG. 1, the output voltage, instead of being compared to a fixed reference is now compared to a reference which varies in linear proportion to the peak input voltage. This results in the error signal from the comparator modifying the duty cycle of the switch 120 to give an output voltage $V_{OUT}$ now proportional to $V_{IN\,(PEAK)}$.

This is shown diagrammatically in FIG. 4 which shows a voltage wave form $V_{IN}$ of the same form as that shown in FIG. 2a, with the output voltage $V_{OUT2}$ being less than the output voltage $V_{OUT1}$ of the convertor of FIG. 1. The ON time t4 of the switch 120 is now less than the ON time t1 shown in FIG. 2a thus resulting in reduced power consumption.

A known bulk convertor suitable for connection to the embodiment of the invention shown in FIG. 3 is illustrated in FIG. 5 and comprises a MOSFET switch 210 controlled by a pulse width modulation circuit 220, for example as manufactured by Astec Semiconductors Division under reference AS3842, which can sense the output voltage of the bulk convertor through a feedback circuit comprising comparator 230 and optical isolator 240. The switch 210 controls current through a transformer 250 which generates an output from the secondary winding which is rectified and smoothed by diodes 250, 260, inductor 270 and capacitor 280. As the pulse width modulation circuit 220 is controlled by feedback circuit 230, 240 in dependence upon the output voltage, the control circuit 220 can compensate for different input voltages from the power factor correction circuit of FIG. 3 and still produce the desired output.

Although the embodiment of the invention has been described with reference to the proprietary high power factor pre-regulator circuit Unitrode UC1854, the invention is applicable for use with discreet component control circuits of similar form, for example as disclosed in our European Patent Application, Publication No. EP352983A, corresponding to U.S. Pat. No. 5,001,620, the contents of which are incorporated herein by reference. For example, for the circuit shown in FIG. 1 of this European Patent Application, the reference voltage $V_{REF}$ fed to the error amplifier in circuit 16 is modified to be dependent upon peak line input voltage in the manner shown in FIG. 3 of the present application.

While the invention has been described with reference to an embodiment in which output voltage is proportional to peak input voltage, the output voltage may be made proportional to any meaningful representation of the magnitude of the input voltage, for example an average of the rectified voltage $V_{IN}$, or an RMS value either of the rectified voltage $V_{IN}$ or the input voltage prior to rectification, and the term "peak input voltage" where used in this specification should be construed to encompass these variations.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A boost-type power factor correction circuit having input for receiving an input voltage and an input current, and an output for providing an output voltage, comprising:
   a boost inductor coupled to said input to receive said input voltage and input current,
   an electronic switch controlling the current through the inductor,
   a capacitor coupled to said output, said output voltage being generated across said capacitor,
   rectifier means connecting the inductor to the capacitor such that energy stored in the inductor is transferable to the capacitor,
   means for cyclically switching the electronic switch such that said switch has a controllable duty cycle,
   means for controlling the switch duty cycle to cause the input current of said correction circuit to follow the input voltage applied to said correction circuit and to regulate the output voltage of said correction circuit to be linearly proportional to a peak value of the input voltage, said controlling means comprising means for comparing the output voltage with a variable reference voltage which is proportional to the peak value of the input voltage and for generating an error signal, and means for generating a control signal for the switch in dependence upon the error signal.

2. A circuit as claimed in claim 1 wherein the controlling means further comprises a peak rectifier for sensing the peak value of the input voltage and generating a voltage proportional thereto to form said variable reference voltage.

3. A circuit as claimed in claim 2 wherein the peak rectifier output voltage is summed with a fixed voltage component to form said variable reference voltage.

4. A boost-type power factor correction circuit having an input for receiving an input voltage and an input current, and an output for providing an output voltage, comprising:
   a boost inductor coupled to said input to receive said input voltage and input current,
   an electronic switching controlling the current through the inductor,
   a capacitor coupled to said output, said output voltage being generated across said capacitor,
   rectifier means connecting the inductor to the capacitor such that energy stored in the inductor is transferable to the capacitor,
   means for cyclically switching the electronic switch such that said switch has a controllable duty cycle,
   means for controlling the switch duty cycle to cause the input current of said correction circuit to follow the input voltage applied to said correction circuit and to regulate the output voltage of said correction circuit to be proportional to a peak value of the input voltage, said controlling means including means for comparing the output voltage with a variable reference voltage which is proportional to the peak value of the input voltage and for generating an error signal, and means for generating a control signal for the switch in dependence upon the error signal.

5. A circuit as claimed in claim 4 wherein the controlling means further comprises a peak rectifier for sensing the peak value of the input voltage and generating a voltage proportional thereto to form said variable reference voltage.

6. A circuit as claimed in claim 5 wherein the peak rectifier output voltage is summed with a fixed voltage component to form said variable reference voltage.

7. The circuit of claim 4 wherein said circuit is incorporated in a power supply.

8. The circuit of claim 7 wherein the power supply comprises a bulk converter and wherein said circuit is coupled to the bulk converter.

9. A circuit as claimed in claim 4 wherein said means for generating said control signal for said switch comprises a multiplier.

10. The circuit of claim 4 wherein said means for controlling the switch duty cycle further comprises a peak rectifier for sensing the peak value of the input voltage and for generating a voltage proportional thereto, and means for summing the voltage generated by said peak rectifier with a fixed voltage component to form said variable reference voltage, and wherein said means for comparing the output voltage with said variable reference voltage includes a differential amplifier having a first input coupled to the output voltage and a second input coupled to said variable reference voltage.

11. The circuit of claim 10 wherein said means for summing comprises a circuit node for providing said variable reference voltage, a first resistor coupled between said circuit node and the voltage generated by said peak rectifier, a second resistor coupled between said circuit node and said fixed voltage component, and a third resistor coupled between said circuit node and a ground reference potential.

* * * * *